Patented May 23, 1939

2,159,016

UNITED STATES PATENT OFFICE 2,159,016

MANUFACTURE OF ARTIFICIAL MATERIALS

Henry Dreyfus, London, England

No Drawing. Application April 2, 1937, Serial No. 134,528. In Great Britain April 29, 1936

7 Claims. (Cl. 8—121)

This invention relates to improvements in the manufacture of artificial materials and particularly to the production of yarns, fabrics and other textile materials, and of foils, films and the like containing organic derivatives of cellulose and having an improved resistance to heat and moisture, and other improved properties.

In United States application S. Nos. 39,288 filed September 5, 1935, 39,289 filed September 5, 1935, 39,290 filed September 5, 1935, and 101,428 filed September 18, 1936, I have described processes for the production of improved artificial materials wherein formed filaments, yarns, foils, films and similar materials having a basis of organic derivatives of cellulose are esterified with acid anhydrides or other esterifying agents in the presence of suitable catalysts, particularly ferric chloride or other metallic chlorides together with hydrochloric acid. By the processes described in the above specifications artificial filaments, yarns and other materials may be obtained which have an improved resistance to moisture and which have different affinities for dyestuffs and different solubilities from those of the starting materials. The products obtained by the processes described in United States application S. Nos. 39,289, 39,290 and 101,428 may also have an increased ironing point. For example, by acetylating cellulose acetate yarns with acetic anhydride in the presence of ferric chloride and hydrochloric acid yarns may be obtained which have an improved ironing point and which are substantially or completely insoluble in acetone.

As described in the above specifications esterification of the organic derivative of cellulose materials may be effected in a bath containing an organic acid anhydride dissolved in a suitable diluent. I have discovered that products having an improved extensibility may be obtained by carrying out the esterification with an esterifying bath containing the organic acid anhydride in a sufficiently high concentration to cause shrinkage of the materials during the esterification process. For example, by acetylating a stretched cellulose acetate yarn in a bath containing acetic anhydride in a concentration of 25 to 30 or 35% by volume dissolved in carbon tetrachloride or other suitable diluent and using ferric chloride in a proportion of about 1 to 2% of the yarn together with hydrogen chloride in an amount equal to 3 or 4 molecular proportions based on the quantity of ferric chloride a product may be obtained which has an improved extensibility as compared with the product obtained by a similar process in which the concentration of acetic anhydride is lower, for example only about 10-12%. In general unstretched yarns require a somewhat lower concentration of swelling agent than stretched yarns in order to effect the same degree of shrinkage.

Alternatively, an esterifying medium may be employed which contains an inert diluent having no swelling action and a shrinking agent which is an organic liquid which has a high swelling or solvent action but which does not react with the materials. Examples of inert diluents having no swelling action which have been found particularly valuable are benzene, toluene, xylene and carbon tetrachloride. Other inert diluents which may be employed are isopropyl and other ethers, tetra- and deca-hydronaphthalenes and kerosene and other higher boiling petroleum hydrocarbons. Examples of suitable liquids having a swelling or solvent action are methylene and ethylene dichlorides, dioxane and methylene ethylene ether.

By carrying out the acetylation or other esterification in liquid media containing solvents or other swelling agents, which do not react with the cellulose derivative materials, in such concentration that the media have a swelling and shrinking action on the materials, the concentration of acetic anhydride or other esterifying agent necessary may be very considerably reduced. This reduction in the concentration of esterifying agent is advantageous not only from the economic point of view but also since it facilitates the removal of residual esterifying agent from the products after esterification. Moreover certain catalysts tend to react with the esterifying agent to form substances which are insoluble in the esterifying medium, which is undesirable from various points of view, and this tendency is reduced when a smaller proportion of testifying agent is employed. Thus, for example, a medium containing benzene or other inert liquid in a concentration of about 50, 60 or 75% by weight, methylene chloride or other swelling agent in a concentration of about 25, 35 or 45% by weight and acetic anhydride or other esterifying agent in a concentration of about 1.5, 2.5 or 3% by weight may be employed.

Instead of effecting shrinkage during the esterification process the yarns or other materials may be shrunk by a pretreatment with a solution of the organic acid anhydride to be employed in the subsequent esterification, or with a swelling medium containing or consisting of an agent which has a swelling action on the materials and does not react with them. Examples of suitable agents are ethyl acetate, cyclohexanol acetate, methylene and ethylene dichlorides and the other solvents and swelling agents referred to above in connection with shrinking during esterification. The medium may comprise benzene, carbon tetrachloride or other of the inert diluents specified above. For example, stretched cellulose acetate yarn may be immersed for 5 to 10 minutes in a 35 to 40% solution by volume of acetic anhydride in carbon tetrachloride or a 50% solution of methylene chloride in carbon tetrachloride and may then be subjected to an acetylation process using ferric chloride, hydrochloric acid and acetic anhydride dissolved in carbon tetrachloride as described in United States application S. No. 39,290. Instead of hydrochloric acid an equivalent quantity of acetyl chloride may be employed.

Shrinkage of the yarn by means of the organic acid anhydride or other shrinking agent may be effected at ordinary temperatures or at somewhat increased temperatures, e. g., 30° to 35° C. The degree of shrinkage may be low, e. g., 3 or 6% of the original length of the materials, or higher degrees of shrinkage, e. g., 10 or 15% may be effected.

The process of the present invention is particularly valuable in connection with the acetylation of cellulose acetate yarns and similar materials with acetic anhydride, but it is applicable generally to the esterification of cellulose derivative materials with acid anhydrides or acid chlorides in the presence of suitable catalysts, for example those mentioned in the specifications referred to above. Thus artificial yarns, fabrics, foils, films and other materials having a basis of cellulose acetate, cellulose propionate, cellulose butyrate, cellulose acetate-propionate and other esters and mixed esters of cellulose, of methyl, ethyl and butyl celluloses and other ethers and mixed ethers of cellulose and of ether-esters of cellulose, for example ethyl cellulose acetate, may be esterified with acetic, propionic, butyric and other acid anhydrides and with acetyl chloride and other acid chlorides in the presence of any of the catalysts referred to in the prior specifications. Anhydrides or chlorides of lower fatty acids, i e., acids containing not more than six carbon atoms, are particularly suitable. The most suitable catalysts are the halides, and particularly the chlorides, of iron, tin and zinc, and especially ferric chloride. Preferably halide catalysts are employed in conjunction with a hydrohalide acid or with an acid halide. Esterification may be carried out under normal pressure or under super-atmospheric pressures.

The process of the present invention is applicable to the treatment of normal cellulose derivative yarns, such as are obtained by the ordinary dry spinning process, or cellulose derivative yarns which have been subjected to after-treatment processes, for example stretching and/or shrinking. Thus cellulose derivative yarns which have been stretched in the presence of steam or hot water as described in United States application S. Nos. 123,104 filed January 30, 1937, 123,105 filed January 30, 1937, 123,106 filed January 30, 1937, 121,150 filed January 18, 1937, 121,151 filed January 18, 1937, 121,152 filed January 18, 1937, and 17,242 filed April 19, 1935, or shrunk by treatment with latent solvents or other shrinking agents as described in United States Patent No. 2,058,422, dated October 27, 1936, filed May 13, 1932, may be subjected to the process of the present invention. In general it is found that stretched yarns are more resistant to the esterification process of the present invention than are normal yarns, and it is, therefore, necessary to employ more vigorous conditions, for example a higher concentration of catalyst, or to continue esterification for a longer time than in the case of normal yarns in order to effect the same degree of esterification.

Yarns may be pretreated and/or esterified in the form of hanks or on bobbins or other packages. Packages which are to be subjected to the pretreatment and/or esterification process of the present invention preferably have an open wind (i. e., wound with a quick traverse), so that they are easily permeated by the treatment liquid. The yarns may be composed of continuous filaments or of short lengths of fibres as in staple fibre yarn. Mixed yarns containing cellulose derivative filaments or fibres and filaments or fibres of other materials, for example regenerated cellulose or cotton, may be esterified according to the process of the present invention. Cellulose derivative materials may also be esterified in the form of fabrics. The process is also applicable to the esterification of foils, films and similar materials.

The general conditions of esterification, for example the concentration of catalysts, are similar to those employed in the prior specifications to which reference is made in this connection.

The following examples are given to illustrate the process of the present invention, but are not to be regarded as limiting it in any way:—

*Example 1*

An acetylating medium having the following composition:

| | Parts by weight |
|---|---|
| Carbon tetrachloride | 115 |
| Methylene chloride | 40 |
| Acetic anhydride | 3 |
| Acetyl chloride | .5 |
| Ferric chloride | .05 | is circulated for about 2 hours through open wound bobbins of stretched cellulose acetate yarn which has previously been washed free from any lubricant. On completion of acetylation the yarn is dried, washed free from residual acetic anhydride with a dilute solution of sodium carbonate and is finally washed with hot water and dried at atmospheric temperature. The yarn obtained has an improved extensibility, is substantially insoluble in acetone, has an increased acetyl value, an improved resistance to ironing and to treatment with hot aqueous media and a decreased affinity for the ordinary cellulose acetate dyestuffs.

*Example 2*

Hanks of stretched cellulose acetate yarn are immersed for about 15 minutes in a mixture containing 37% of acetic anhydride and 63% of carbon tetrachloride. They are then treated in a medium containing about 900 parts of carbon tetrachloride, 80 parts of acetic anhydride, 1 part of ferric chloride and 1.3 parts of acetyl chloride for about 2 hours. On completion of acetylation the yarn is treated as in Example 1 and a product having similar properties is obtained.

*Example 3*

Hanks of stretched cellulose acetate yarn are treated for about 30 minutes in a bath containing about 1,000 parts of acetic anhydride, 2,000 parts of carbon tetrachloride, 1 part of anhydrous ferric chloride and 2 parts af acetyl chloride. The acetylated yarn is treated as in the previous examples and a similar product is obtained.

On account of their improved resistance to moisture and their high insulating power the products obtained according to the processes described in the present specification and in United States application S. Nos. 39,288, 39,289, 39,290 and 101,428 are particularly valuable for use in the insulation of electrical conductors or other electrical materials. They are also of value for heat insulation and soundproofing.

Having described my invention what I desire to secure by Letters Patent is:

1. Process for improving the properties of artificial materials, which comprises subjecting artificial filaments, foils and similar materials having a basis of an organic derivative of cellulose which is soluble in organic solvents to esterification in a non-solvent liquid medium having a shrinking action on the materials and containing a low concentration of an esterifying agent therefor and a high concentration of an organic liquid which has a solvent or high swelling action on the materials but which is chemically inert to them.

2. Process for improving the properties of artificial materials, which comprises subjecting artificial filaments, foils and similar materials having a basis of an organic derivative of cellulose which is soluble in organic solvents to esterification in a non-solvent liquid medium having a shrinking action on the materials and containing a lower fatty acid anhydride in a concentration of between 1.5 and 3% and an organic liquid, which has a solvent or high swelling action on the materials but which is chemically inert to them, in a concentration of at least 25%.

3. Process for improving the properties of artificial materials, which comprises subjecting artificial filaments, foils and similar materials having a basis of acetone-soluble cellulose acetate to acetylation in a non-solvent liquid medium having a shrinking action on the materials and containing acetic anhydride in a concentration of between 1.5 and 3% and an organic liquid, which has a solvent or high swelling action on the materials but which is chemically inert to them, in a concentration of at least 25%.

4. Process for improving the properties of artificial materials, which comprises subjecting artificial filaments, foils and similar materials having a basis of acetone-soluble cellulose acetate to acetylation in a non-solvent liquid medium having a shrinking action on the materials and containing acetic anhydride in a concentration of between 1.5 and 3% and an organic liquid, selected from the group consisting of methylene and ethylene dichlorides, in a concentration of at least 25%.

5. Process for improving the properties of artificial materials, which comprises subjecting artificial filaments, foils and similar materials having a basis of an organic derivative of cellulose which is soluble in organic solvents to esterification in a non-solvent liquid medium having a shrinking action on the materials and containing a low concentration of a lower fatty acid anhydride, a high concentration of an organic liquid which has a solvent or high swelling action on the materials but which is chemically inert to them, and a metal halide as catalyst.

6. Process for improving the properties of artificial materials, which comprises subjecting artificial filaments, foils and similar materials having a basis of acetone-soluble cellulose acetate to acetylation in a non-solvent liquid medium having a shrinking action on the materials and containing acetic anhydride in a concentration of between 1.5 and 3%, an organic liquid, which has a solvent or high swelling action on the materials but which is chemically inert to them, in a concentration of at least 25%, and ferric chloride as catalyst.

7. Process for improving the properties of artificial materials, which comprises shrinking artificial filaments, foils and similar materials having a basis of an organic derivative of cellulose which is soluble in organic solvents by 3 to 10% of their original length during their esterification in a non-solvent liquid medium having a shrinking action on the materials and containing a low concentration of an esterifying agent therefor and a high concentration of an organic liquid which has a solvent or high swelling action on the materials but which is chemically inert to them.

HENRY DREYFUS.